United States Patent [19]

Matsumoto et al.

[11] Patent Number: 5,606,632
[45] Date of Patent: Feb. 25, 1997

[54] DEVICE AND METHOD FOR REDUCING THE SIZE OF A COLOR IMAGE TO DISPLAY SEPARATE COLOR IMAGES SIMULTANEOUSLY ON A SCREEN

[75] Inventors: Hitoshi Matsumoto; Takahiro Kii; Seiki Shibata; Fumio Honda; Hitomi Baba, all of Kawasaki, Japan

[73] Assignee: Fujitsu Limited, Kawasaki, Japan

[21] Appl. No.: 455,724

[22] Filed: May 31, 1995

Related U.S. Application Data

[63] Continuation of Ser. No. 68,125, May 27, 1993, abandoned.

[30] Foreign Application Priority Data

May 28, 1992 [JP] Japan .................................. 4-137078

[51] Int. Cl.⁶ ...................................................... G06K 9/42
[52] U.S. Cl. .......................................... 382/298; 382/162
[58] Field of Search ................................... 382/276, 298, 382/232; 348/717, 393, 562, 566, 567, 568; 345/27, 129, 155, 186, 187, 199, 202; 358/523, 528, 540; 395/102, 128, 131, 139, 425

[56] References Cited

U.S. PATENT DOCUMENTS

| | | | |
|---|---|---|---|
| 4,649,380 | 3/1987 | Penna ...................................... | 345/199 |
| 4,821,208 | 4/1989 | Ryan et al. ............................. | 345/155 |
| 5,058,174 | 10/1991 | Carroll .................................... | 382/1 |
| 5,068,644 | 11/1991 | Batson et al. .......................... | 345/199 |
| 5,204,665 | 4/1993 | Bollman et al. ........................ | 345/155 |
| 5,227,863 | 7/1993 | Bilbrey et al. .......................... | 358/22 |

OTHER PUBLICATIONS

Mano, *Computer System Architecture*, Second Edition, Prentice–Hall (1982).

*Primary Examiner*—Jose L. Couso
*Attorney, Agent, or Firm*—Staas & Halsey

[57] ABSTRACT

A device comprises a look-up table translating unit, a region dividing unit and a reduced image generating unit to reduce the size of a color image using look-up tables and a reference look-up table. Each of the look-up and reference look-up tables has as many entries as there are the pixel values. The look-up table translating unit creates an entry check table. The entry check table is for translating the table entries of the look-up table into the those of the reference look-up table. The region dividing unit divides the original color image into a plurality of regions. The reduced image generating unit accesses the entry check table and the reference look-up table to selectively determine a representative pixel of the region based on the RGB values thereof to generate the reduced color images.

18 Claims, 6 Drawing Sheets

F I G. 1

| ENTRY NO. | RED | GREEN | BLUE |
|---|---|---|---|
| 0 | 100 | 100 | 0 |
| 1 | 110 | 110 | 0 |
| 2 | 130 | 130 | 0 |
| 3 | 100 | 100 | 100 |
| ⋮ | ⋮ | ⋮ | ⋮ |
| 255 | ××× | ××× | ××× |

| ENTRY NO. OF LOOK-UP TABLE | ENTRY NO. OF REFERENCE LOOK-UP TABLE |
|---|---|
| 0 | 103 |
| 1 | 103 |
| 2 | 117 |
| 3 | 104 |
| ⋮ | ⋮ |

| ENTRY NO. | RED | GREEN | BLUE |
|---|---|---|---|
| 0 | 0 | 0 | 0 |
| 1 | 0 | 0 | 85 |
| 2 | 0 | 0 | 170 |
| 3 | 0 | 0 | 255 |
| ... | ... | ... | ... |
| | i×36 | j×36 | k×85 |
| ... | ... | ... | ... |
| 255 | 252 | 252 | 255 |

FIG. 3

| ENTRY NO. | RED | GREEN | BLUE |
|---|---|---|---|
| 0 | 0 | 0 | 0 |
| 1 | 0 | 0 | 1 |
| 2 | 0 | 0 | 2 |
| 3 | 0 | 0 | 3 |
| ... | ... | ... | ... |
| 103 | 3 | 3 | 0 |
| 104 | 3 | 3 | 1 |
| ... | ... | ... | ... |
| 117 | 4 | 4 | 0 |
| ... | ... | ... | ... |
| | i | j | k |
| ... | ... | ... | ... |
| 255 | 7 | 7 | 3 |

DEVICE AND METHOD FOR REDUCING THE SIZE OF A COLOR IMAGE TO DISPLAY SEPARATE COLOR IMAGES SIMULTANEOUSLY ON A SCREEN

This application is a continuation of application Ser. No. 08/068,125, filed May 27, 1993, now abandoned.

BACKGROUND OF THE INVENTION

This invention relates to a device and a method for reducing the size of a color image to display various color images simultaneously on a screen capable of displaying several colors.

A color gamut for a typical color monitor consists of approximately 16 million colors, all of which are not required in a single picture in many color applications. The range of colors that can be displayed on the monitor is clearly smaller than that of all colors. For example, some color systems have a color monitor allowing 256 colors to be displayed simultaneously. Such a color system often includes a look-up table having as many entries as there are pixel values. Each pixel of a pixel map (color image) has any one of the pixel values as an index into the look-up table. The look-up table stores the table entries and the corresponding red(R), green(G), and blue(B) component values. To display a color image on a screen, the table entry is accessed for each pixel, thereby loading the RGB component values. The color system also comprises a single look-up table where the loaded RGB component values are stored. The RGB component values are used to control the color monitor for displaying color images with, for example, 256 colors.

In such a conventional color system, a different look-up table is required for every one original color image and thus a plurality of look-up tables are necessary for displaying various color images. To display a plurality of color images simultaneously on a single screen, each original image must be reduced in size while the corresponding look-up table is being accessed. Upon displaying the reduced images on the screen, the look-up operation is done for each reduced image with its corresponding look-up table. Color or chromlnal information for a first reduced image is loaded up from a first look-up table, following which the first image is displayed in a given region on the screen using the look-up table in the system. Subsequently, color information for a second reduced image is loaded up from a second look-up table. The look-up table in the system is again used to display the second image on the screen. This may result in a problem such as the appearance of the second image causing the first image to disappear from the screen. With respect to this, a common look-up table (hereinafter referred to as a reference look-up table) is prepared in which the RGB values are assigned previously to the table entries. This RGB value is referred hereinafter to a reference RGB value as distinguished from the RGB value stored in the "individual" look-up tables.

An original color image is divided into several regions or partitions and thus the resulting image consists of m by n regions, where m and n are predetermined positive integers larger than one. Each region includes a plurality of pixels composing the original color image. The RGB value of each pixel is obtained for every region by accessing the look-up table based on the pixel values. Subsequently, an average is calculated for the RGB values of all pixels in a single region to determine a representative pixel having the RGB value (hereinafter referred to as a representative RGB value) equal to the average RGB value. In this way, one representative pixel is obtained for each region, that is, a reduced color image consists of the representative pixels equal in number to the regions. The reference look-up table is then accessed to obtain the reference RGB value that is closest to the representative RGB value of each representative pixel. In addition, the table entry of the representative pixel is translated into the table entry of its closest reference RGB value. This translation between the table entries is carried out for all look-up tables. As a result, the table entries of each look-up table are translated into the table entries of the reference look-up table that, in turn, corresponds to the look-up table in the system. The table entry of the reference look-up table is referred to as a reference look-up table hereinafter. The desired color images can thus be displayed simultaneously on the screen by means of accessing the reference look-up table according to the pixel values of the representative pixels. This could be the clue to search the images.

The above mentioned conventional method requires that the look-up table be loaded as many times as the number of the representative pixels corresponding to the number of translation of the table entries. This means that the original image having screen resolution of 400 by 200 pixels can be reduced into an image including the representative pixels of 200 by 100 after the translation of twenty thousand times. Such a time-consuming processing is undesirable by various considerations.

Accordingly, the present invention is directed to overcome the above problems and an object thereof is to provide a device and a method for reducing the size of a color image at high speed.

SUMMARY OF THE INVENTION

According to a first aspect of the present invention, a device for reducing the size of an original color image reduces color image to express a plurality of reduced color images with any of predetermined colors simultaneously. Each of the original and reduced color images consists of a plurality of pixels having a respective pixel value. A RGB value consists of red, green and blue component values. A device for reducing the size of a color image comprises look-up tables storing unit, a reference look-up table storing unit, a look-up table translating unit, and a color image reducing unit. The look-up table storing unit stores a plurality of look-up tables. Each of the look-up tables corresponds to one of a plurality of original color images. Each of look-up tables stores table entries and the corresponding RGB value of each pixel of the corresponding original color image to express the same with any of the predetermined colors. The reference look-up table storing unit stores a reference look-up table having as many reference table entries as there are pixel values. The reference look-up table stores the RGB values assigned previously to the corresponding table entries to express the reduced color images with any of the predetermined colors. The RGB value may be varied step-wise and regularly. The look-up table translating unit calculates the RGB value in the reference look-up table closest to the RGB value for each entry of the look-up table to create an entry check table. The entry check table is for use in translating the table entries of the look-up table into the reference table entries. The color image reducing unit reduces the size of the original color image by accessing the entry check table and the reference look-up table to generate the reduced color images.

According to the above mentioned first aspect, the reference look-up table is prepared before reducing the size of the original color image. The reference look-up table stores the RGB values assigned previously to the corresponding table entries to express reduced color images with any of the predetermined colors.

The look-up table translating unit calculates the RGB value in the reference look-up table closest to the RGB value for each table entry of the look-up table. In addition, it creates the entry check table for use of translating the table entries of the look-up table into the reference table entries.

The color image reducing unit reduces the size of the original color images by means of accessing the entry check table and the reference look-up table to generate the reduced color images.

Briefly, before reducing the size of the color image, the entry check table is created which is for use in translating the table entries of the look-up table into the reference table entries. So, only the number of the table entries in the look-up table is the number of RGB calculations for translating the table entries of the look-up table into the reference table entries. As a result, the processing speed is extremely increased for reducing the size of the original color image.

In a method for reducing the size of a color image according to a second aspect of the present invention, a color image expresses a plurality of reduced color images with any of predetermined colors simultaneously. Each of the original and reduced color images consists of a plurality of pixels having a respective pixel value and RGB value consisting of red, green and blue component values. The color image is reduced in size using a plurality of look-up tables. Each of the look-up table is prepared for a respective one of the original color images for storing the table entry and the corresponding RGB value of each pixel of the corresponding original color image to express the same with any of the predetermined colors. A reference look-up table is also prepared, in which the RGB values are assigned previously to the corresponding table entries to express the reduced color images with any of the predetermined colors. The reference RGB value closest to the RGB value for each table entry of the look-up table is calculated. An entry check table is created for translating the table entries of the look-up table into the reference table entries. The size of the original color images is reduced by means of accessing the entry check table and the reference look-up table to generate the reduced color images.

This second aspect has an effect similar to that of the first aspect.

These and other objects and features of the present invention will become more fully apparent from the following description and appended claims taken in conjunction with the accompanying drawing.

DESCRIPTION OF THE PREFERRED EMBODIMENT

Figure 1:
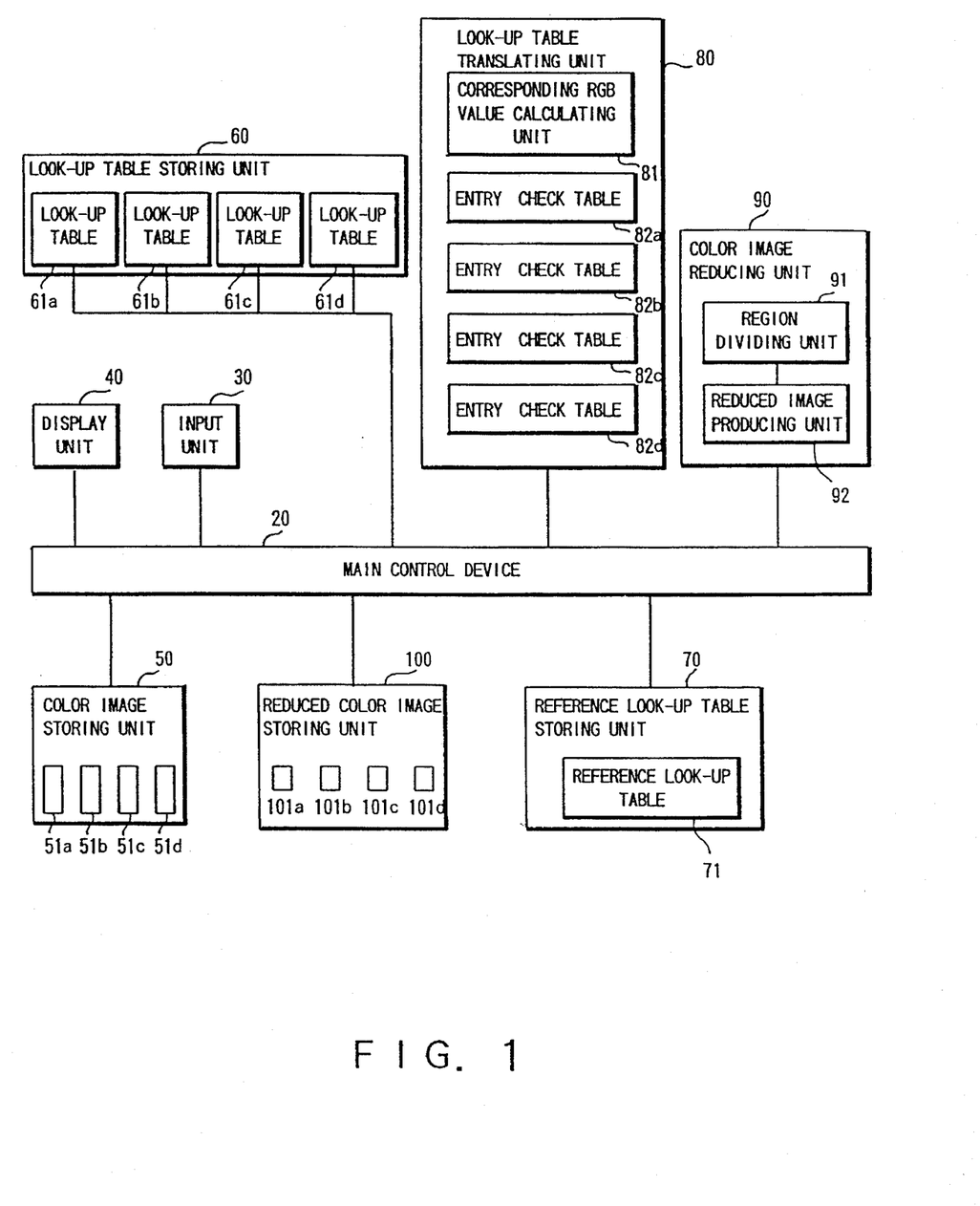
FIG. 1 is a structural block diagram of a device for reducing the size of a color image according to an embodiment of the present invention.

A preferred embodiment of the present invention is described below with reference to the drawing. FIG. 1 is a structural block diagram of a device for reducing the size of a color image according to an embodiment of the present invention. Throughout the following detailed description, similar reference numerals refer to similar elements in all figures of the drawing.

Figure 2:
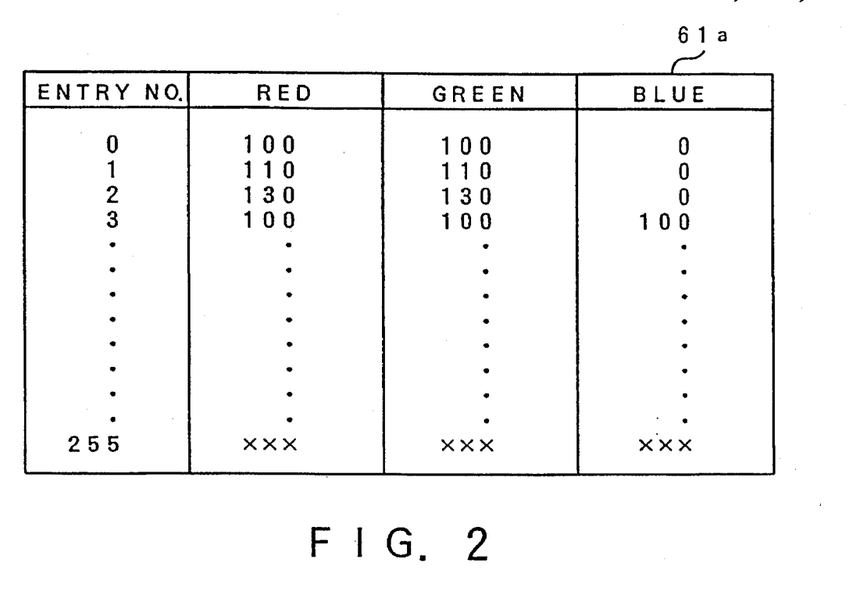
FIG. 2 shows an example of a 256-entry reference look-up table of twenty-four bits, eight each for red, green, and blue.

In FIG. 1, a main control device 20 is connected to an input unit 30, a display unit 40, a color image storing unit 50, a look-up table storing unit 60, a reference look-up table storing unit 70, a look-up table translating unit 80, a color image reducing unit 90, and a reduced color image storing unit 100. The main control device 20 is implemented by, for example, a central processing unit (CPU) or a microprocessor. The input unit 30 such as a keyboard or a mouse is for supplying a series of instructions to each of the other units. The display unit 40 is realized by, for example, a color monitor or a liquid crystal display (LCD) capable of displaying several colors. In this embodiment, the display unit 40 allows to 256 colors at maximum. The display unit 40 displays t color images (in this embodiment t is equal in number to four) reduced in size and supplied,from the reduced color image storing unit 100. It is noted that the number t of the reduced color images is equal to look-up tables and original color images, both of which are four in this embodiment. The color image storing unit 50 is realized by a disc or an IC memory and stores four original color images 51*a* through 51*d*. Likewise, the look-up table storing unit 60 stores four look-up tables 61*a* through 61*d*. The original color images 51*a* through 51*d* correspond to the look-up tables 61*a* through 61*d*, respectively. Each of the look-up tables 61*a* through 61*d* stores table entries and the corresponding RGB values for each pixel to display the same on the screen from a possible selection of 256 colors in this embodiment. Thus the look-up table 61*a* is a 256-entry table as shown in FIG. 2. It stores the table entries 0 through 255 and the corresponding RGB values to display the original color image 51*a* with any of 256 colors. The look-up tables 61*b* through 61*d* are not shown in detail but are also 256-entry tables similar to the look-up table 61*a*. Accordingly, it is understood that each of the look-up tables 61*b* through 61*d* stores the table entries 0 through 255 and the corresponding RGB values to display the original color images 51*b* through 51*d*, respectively, with any of 256 colors. In FIG. 2, each content of the look-up table 61*a* like 110 or 130 is represented as a decimal value that, in practice, is represented as a digital value (binary) of eight bits. In other words, eight bits are required for each of the three primary colors red, green and blue. For example, the component value 130 can be represented as an eight-bit value of "10000010" while the component value 110 represented as "1101110."

Figure 3:
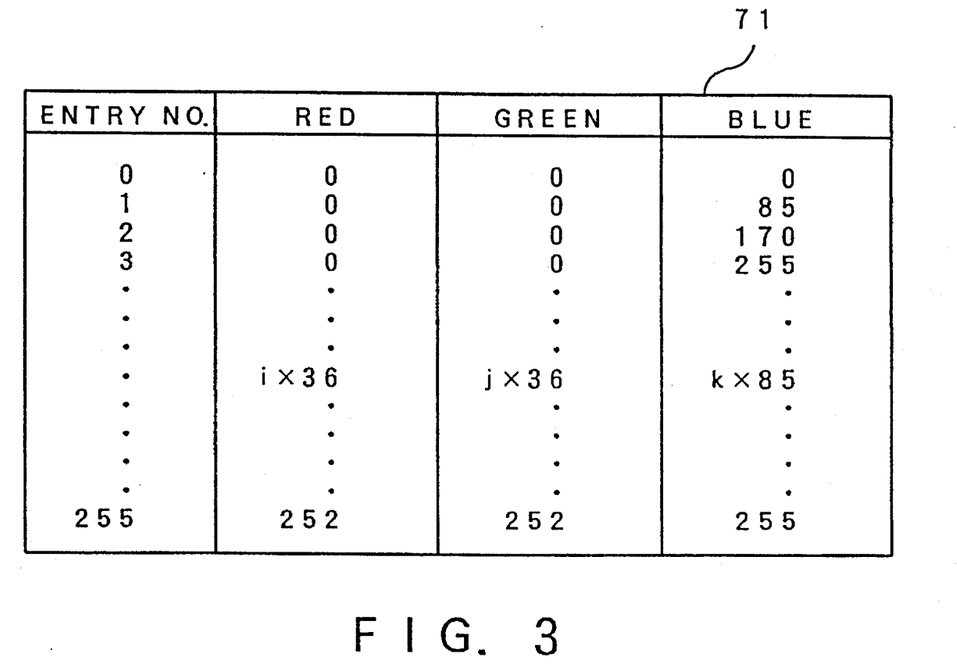
FIG. 3 shows an example of a 256-entry reference look-up table of eight bits, three each for red and green, and two for blue.

The reference look-up table storing unit 70 stores the reference look-up table 71. In the reference look-up table 71 the RGB values varied step-wise are assigned previously to the table entries. An example of the reference look-up table 71 is shown in FIG. 3. Each of the red, green and blue components has a value being varied step-wise based on the following equations:

$$R=36i, G=36j, \text{ and } B=85k \quad (1)$$

In this event, each of i and j is a positive integer ranging from zero through seven, both inclusive, while k is a positive integer ranging from zero through three, both inclusive. Thus, for the reference look-up table 71, one-third as many bits are needed as compared with the look-up table 60a shown in FIG. 2. Since thirty-six and eighty-five are constants, three bits for each of i and J, and two bits for k. The total eight bits are sufficient for displaying 256 ($2^8$) colors on the screen. In addition, these constants are given as follows. Two hundred and fifty-six divided by seven gives thirty-six with four over while two hundred and fifty-six divided by three gives eighty-five and remainder one. Accordingly, the values of red and green components are equal to either one of 0, 36, 72, 108, 144, 180, 216, and 252. Likewise, the value of blue component is equal to either one of 0, 85, 170, and 255. More specifically, one of i, j, and k is changed at a time to cause the RGB value to be varied step-wise. The table entry (pixel value) 0 corresponds to the RGB value (0, 0, 0), table entry 1 corresponds to the RGB value (0, 0, 85) and table entry 2 corresponds to the RGB value (0, 0, 170) or the like.

Figure 4:
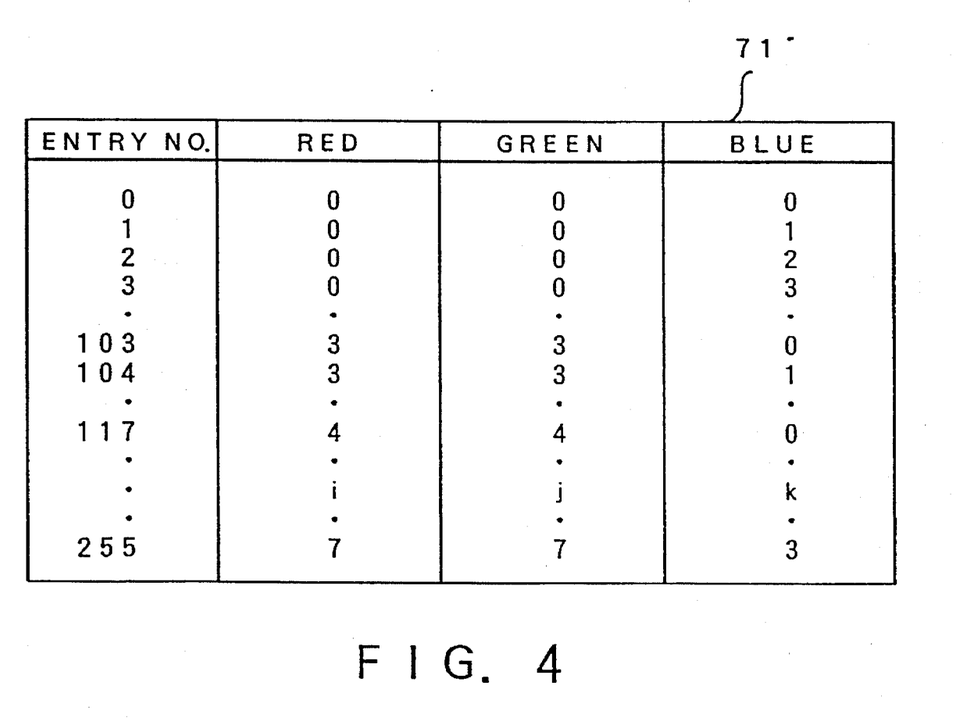
FIG. 4 shows an example of a 256-entry reference look-up table of eight bits similar to that illustrated in FIG. 3 except for the contents thereof.

In FIG. 3, the component values are appeared as products of the constants and variables i, j, and k. However, it is also possible to create the reference look-up table including only the variables as the reference look-up table 71' shown in FIG. 4. Further, it is noted that other reference look-up tables can equally be applied to the present invention other than the above mentioned 256-entry reference look-up table 71 or 71'. For example, in case where a color monitor is capable of displaying 4096 ($2^{12}$) colors simultaneously, each of i, j and k may be a positive integer ranging from zero through fifteen, both inclusive, four bits for each. The constants may be given by dividing 4096 by fifteen, i.e., two hundred and seventy-three.

The look-up table translating unit 80 comprises a corresponding RGB value calculating unit 81 and entry check tables 82a through 82d. The corresponding RGB value calculating unit 81 calculates, according to the following equation (2), the reference RGB values ($r_1$, $g_1$, $b_1$) of the reference look-up table 70 closest to the RGB values (r, g, b) of the look-up tables 61a through 61d. In addition, the corresponding RGB value calculating unit 81 translates the table entries of the look-up table into the reference table entries.

$$r_1=36(r/36+\tfrac{1}{2}),$$

$$g_1=36(g/36+\tfrac{1}{2}), \text{ and}$$

$$b_1=85(b/85+\tfrac{1}{2}) \quad (2),$$

where the red, green, and blue component values of the reference RGB value are represented by $r_1$, $g_1$, and $b_1$, respectively. One-half is added considering the decimal fractions of r, g, and b values. As mentioned above, the RGB value is varied step-wise and regularly, resulting in the easier calculation of the desired reference RGB values compared with a case using a reference look-up table including the RGB values randomly assigned. This means that the necessary time for the calculation will be reduced significantly.

Figure 5:
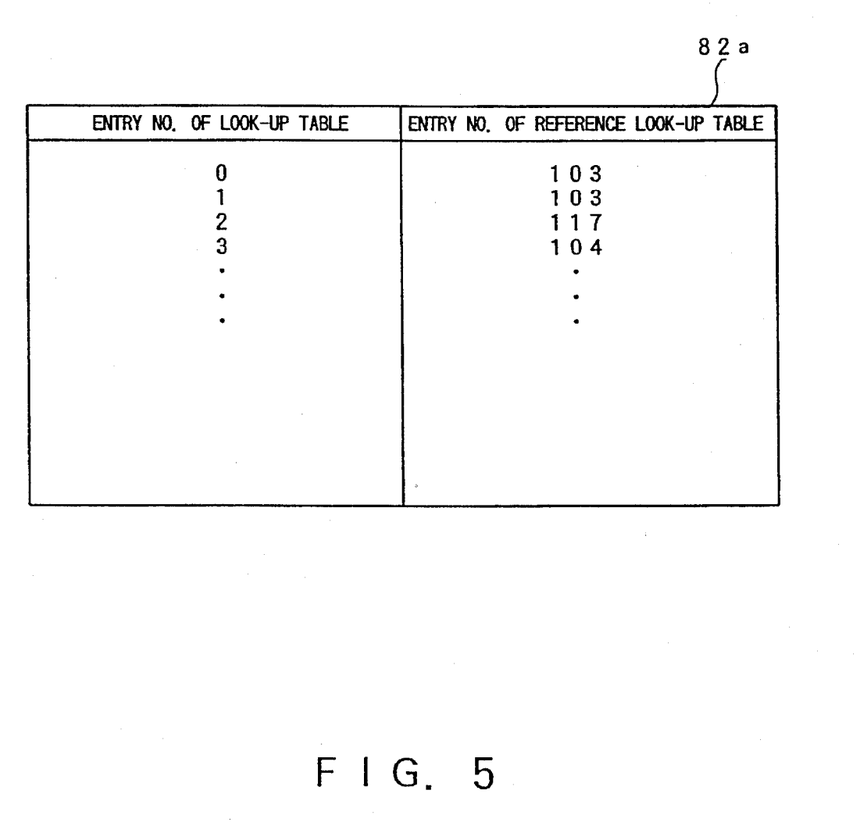
FIG. 5 is a view showing an example of an entry check table.

As shown in FIG. 5, the entry check table 82 stores each table entry of the look-up table and its corresponding reference table entry according to the calculation results obtained by the corresponding RGB value calculating unit 81. While not shown in FIG. 5 to avoid obfuscation, the entry check tables 82a through 82d are all for use in translating the table entries of the look-up table into the reference table entries.

Figure 6:
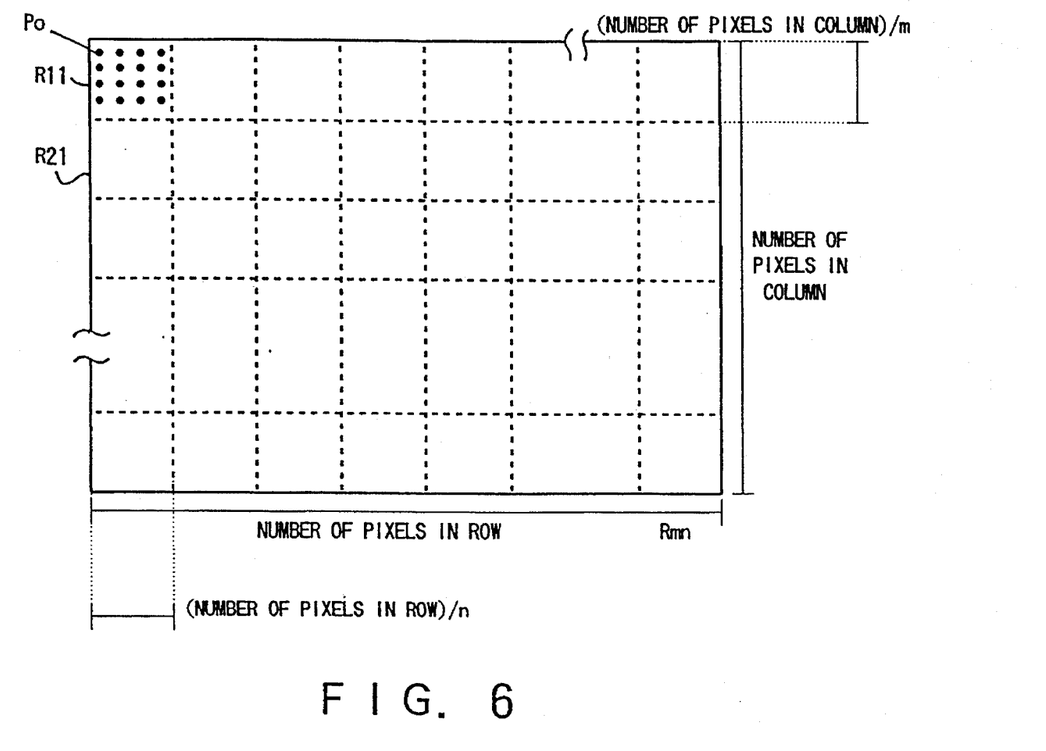
FIG. 6 is a view for use in describing division of an original color image.
Figure 7:
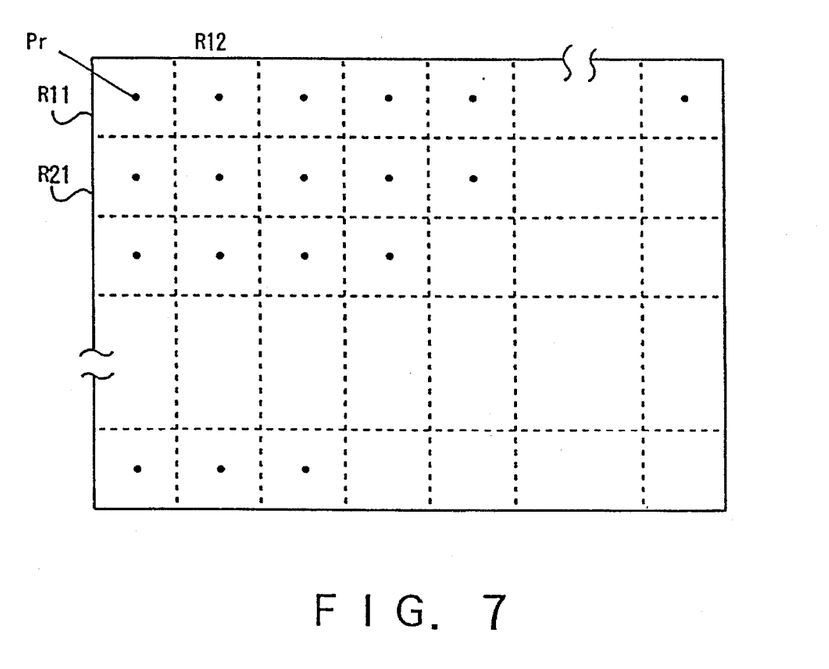
FIG. 7 is a view showing a reduced color image consisting of a plurality of representative pixels.

A color image reducing unit 90 comprises a region dividing unit 91 and a reduced image generating unit 92. The region dividing unit 91 divides each of the original color images 51a through 51d into a plurality of regions or partitions as shown in FIG. 6. The resulting image consists of m by n regions, where m and n are predetermined positive integers larger than one. In this figure, an abscissa represents the number of pixels in each row while an ordinate represents the number of pixels in each column. Each region includes a plurality of pixels Po, which are shown only for the region R11 in FIG. 6 only for the purpose of simplifying the figure. The reduced image generating unit 92 accesses the entry check tables 82a through 82d and the reference look-up table 71 for each pixel Po, thereby loading the RGB value corresponding to the table entry for the given pixel. Subsequently, as shown in FIG. 7, the reduced image generating unit 92 selectively determines a representative pixel Pr of each region based on the RGB values thereof. More particularly, the representative pixel Pr is obtained by means of averaging all RGB values of a given region. In this event, it is preferable to use the reference look-up table like the one shown in FIG. 4 rather than that in FIG. 3 to facilitate the averaging operation.

The reduced color image storing unit 100 may be any one of suitable memories to store reduced color images 101a through 101d obtained by the color image reducing unit 90.

Figure 8:
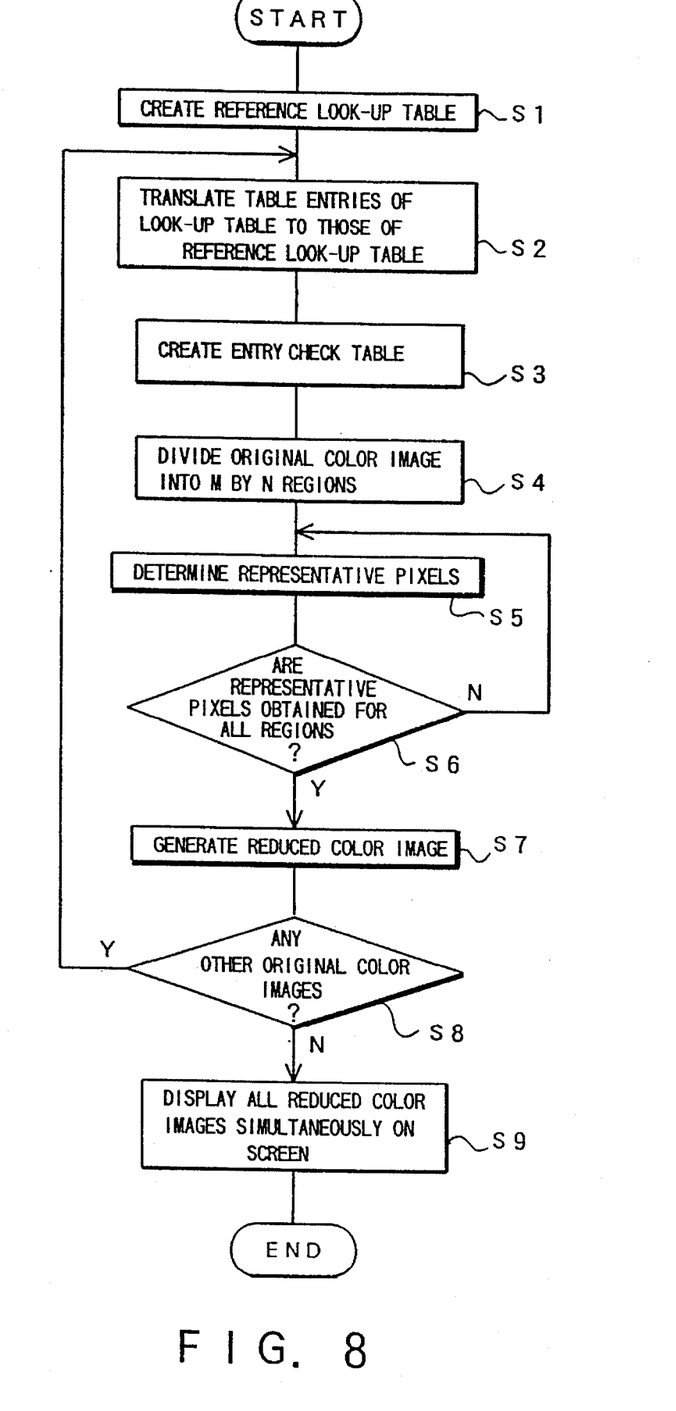
FIG. 8 is a flow chart for use in describing a method for reducing the size of a color image according to the embodiment of the present invention.
Figure 9:
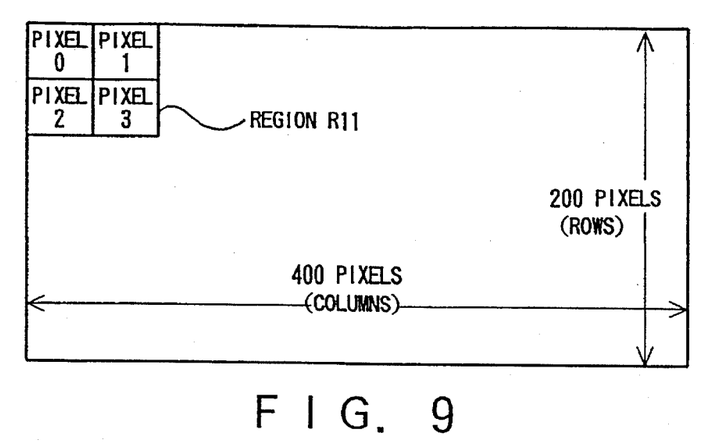
FIG. 9 is a view showing an example of an original color image before translating the look-up table into the reference look-up table.
Figure 10:
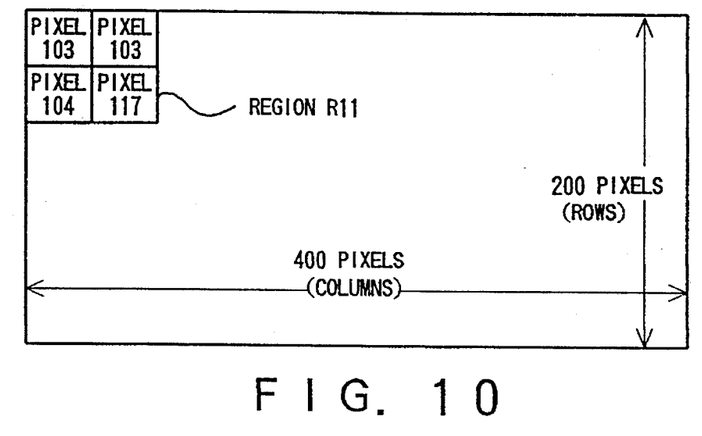
FIG. 10 is a view showing an example of an original color image after translating the look-up table into the reference look-up table.
Figure 11:
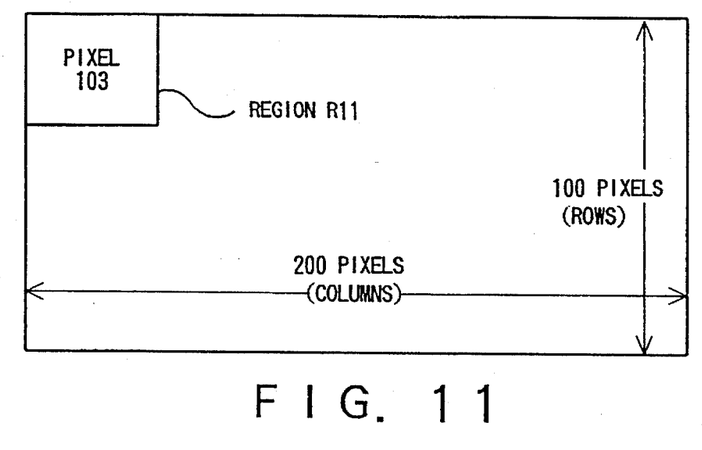
FIG. 11 is a view showing an example of a color image reduced in size according to the embodiment.

Having described the detailed structure and functions of the device for reducing the color image according to the present invention, the operation thereof will now be described while referring to a flow chart shown in FIG. 8 and views showing various images in FIGS. 9 through 11. FIG. 8 is a flow chart for use in describing a method for reducing the size of a color image according to the embodiment of the present invention. FIG. 9 is a view showing an example of the original color image 51a before translating the corresponding look-up table. The region R11 in the original color image 51a consists of four pixels, of which table entries are 0, 1, 2, and 3, respectively. FIG. 10 is a view showing an example of an original color image after translating into the reference look-up table, and FIG. 11 is a view showing an example of a color image reduced in size according to the embodiment.

In FIG. 8, step S1 creates a 256-entry reference look-up table 71 (71') of eight bits in which the RGB values are varied step-wise and regularly. The data representing the constants are supplied from the input unit 30 to the reference look-up table 71. As step S2, the look-up table translating unit 80 receives a series of instructions, supplied from the input unit 30 through the main control device 20, for use in translating the table entries of the look-up tables 61a through 61d into the reference table entries. The corresponding RGB value calculating unit 81 calculates, according to the above equation (2), the RGB value ($r_1$, $g_1$, $b_1$) of the reference look-up table 71 closest to the RGB value (r, g, b) for each table entry of the look-up tables 61a through 61d. In addition, the corresponding RGB value calculating unit 81 translates the table entries of the look-up table into the reference table entries. The corresponding RGB value calculating unit 81 carries out the above mentioned calculation required for translation as many times as the number of table entries in the look-up table 61a. The look-up table 61a in this embodiment stores 256 table entries and therefore the calculation is made only 256 times for each one look-up table.

Subsequent step S3 creates an entry check table where the table entries of the look-up table and the reference table entries are stored as a pair as shown in FIG. 5. At step S4, a series of instructions to reduce the size of the color image are supplied from the input unit 30 to the color image reducing unit 90. In response to these instructions, the region dividing unit 91 divides the original color image 51a into a plurality of regions. For example, the original color image 51a of 400 by 200 pixels is divided into two thousands regions. Each region consists of four pixels, 2 by 2, as shown in FIGS. 9 and 10. While the width and height dimensions of the region R11 is essentially equal to 1/200 and 1/100 of the width and height, respectively, of the image, the region R11 in FIGS. 9 through 11 has been illustrated larger for purposes of clarity in exposition.

At step S5, the reduced image generating unit 92 accesses the entry check table 82a. In this event, the reduced image generating unit 92 loads the reference table entry 103 according to the table entry 0. This reference table entry 103 is used for obtaining the corresponding RGB value (i, j, k)=(3, 3, 0) from the reference look-up table. Similarly, the reduced image generating unit 92 loads the reference table entry 103 according to the table entry 1. This reference table entry 103 is also used for obtaining the corresponding RGB value (3, 3, 0). Likewise, the RGB values (4, 4, 0) and (3, 3, 1) are obtained according to the reference table entries 117 and 104, respectively. After translation, the region R11 of the original color image 51a are as shown in FIG. 10. The reduced image generating unit 92 then calculates the average of the RGB values. The average RGB value is (3, 3, 0), so that the representative pixel of the region R11 has the pixel value of 103 as apparent from FIG. 4. Since the average RGB value is (3, 3, 0), the RGB value of the region R11 can be given as (108, 108, 0) according to the above equation (1).

At step S6, the reduced image generating unit 92 determines whether all regions are subjected to the calculation of the representative pixel. If the step S6 is affirmative, the control passes to step S7. On the other hand, negative decision causes the control to return to the step S5 to form a first loop. The control remains in this first loop until the representative pixels are obtained for all regions. More particularly, the reduced image generating unit 92 accesses the entry check table 82a and the reference look-up table 71 (71') for each pixel Po of the regions R12 through Rmn, thereby loading the RGB value corresponding to the table entry for the given pixel. Upon completion of this calculation operation, step S7 is carried out to generate the reduced color image 101a having 200 by 100 pixels as shown in FIG. 11. This reduced color image 101a is stored in the reduced color image storing unit 100.

At step S8, the reduced image generating unit 92 determines if there are any other original color images. In this embodiment, this step returns to the step S2 when any one of the original color images 51b through 51d remains unprocessed. By carrying out the above mentioned steps S2 through S7 for the original color images 51a through 51d, the reduced color images 101a through 101d, respectively, are generated and stored in the reduced color image storing unit 100. At the subsequent step S9, a series of instructions to load the reduced images are supplied to the main control device 20 through the input unit 30. In response to this, the main control device 20 serves to load the four reduced color images 101a through 101d from the reduced color image storing unit 100. According to the pixel values of the reduced color images 101a through 101d, the main control device 20 accesses the reference look-up table and the entry check table. In this way, the reduced color images 101a through 101d are appeared on the display unit 40 simultaneously. These images could be the clue to search the images.

As mentioned above, in the device and method for reducing the color images in size according to the embodiment of the present invention, the reference look-up table is created previously. Before reducing the size of the color image, the RGB value required for translation is calculated and the entry check table 82 is created which is for use in translating the table entries of the look-up table into the reference table entries. So, the number of calculations required for translation is equal to that of the table entries, i.e., only 256 times in this embodiment for each one look-up table. As a comparison, conventional methods carry out the calculation of the RGB value and the translation into the reference table entries after reducing the size of a color image. This requires to load the look-up table as many times as the number of the pixels while calculating the RGB value as many times as the number of representative pixels.

According to the present invention, only the 256-time calculation is required. As a result, the processing speed is extremely increased for reducing the size of the original color image.

While the present invention has thus been described in conjunction with the particular embodiment thereof, it is to be understood that various modifications can be made without departing from the spirit of the present invention. For example, four entry check tables are provided in the above embodiment, which may be a single one for all look-up tables. In this event, the contents of the entry check table may be renewed for each of the different original images. This contributes to simplify the structure of the look-up table translating unit.

In addition, the above embodiment applies the color monitor capable of displaying 256 colors, having the screen resolution of 400 by 200 pixels. However, as a case may be, other number of colors and the resolution can be selected. In this case, the red, green and blue component values are represented by i, j and k bits digital valunes, respectively, where ($2^{i+j+k}$) is equal to the number of the predetermined colors. Besides, the pixel value of the representative pixel is not limited to the average of the given pixel values. The maximum or minimum pixel value can be equally applied as that of the representative value. Further, the number of reduced images displayed on the screen simultaneously is not limited to four. The scope of the present invention is therefore to be determined solely by the appended claims.

Furthermore, each of the representative pixels can be determined by selecting a pixel with every interval in vertical and horizontal directions from all the pixels which compose the original color image. In this case, the region deviding unit described in the embodiment is not required.

What is claimed is:

1. A device for reducing the size of an original color image as a reduced color image and expressing a plurality of reduced color images with predetermined colors simultaneously, each of the original and reduced color images comprising a plurality of pixels, each pixel having a respective pixel value, said device comprising:

look-up table storing means for storing a plurality of look-up tables, each of the look-up tables being prepared for a respective one of the original color images and for storing the table entry and a corresponding RGB value of each pixel of a corresponding original color image expressing same with the predetermined colors, a number of the plurality of look-up tables being equal to a number of the plurality of reduced color images and to a number of the original color images;

reference look-up table storing means for storing a reference look-up table having a number of reference table entries equal to a number of the pixel values, the reference look-up table storing the RGB values, as reference RGB values, assigned previously to corresponding table entries expressing the reduced color images with the predetermined colors;

look-up table translating means for calculating the reference RGB values closest to the RGB values of the look-up tables for creating entry check tables, each entry check table corresponding to one of the plurality of look-up tables and for use in translating the table entries of the look-up tables into the reference table entries;

color image reducing means for reducing a size of the original color images by accessing one of the entry check tables and generating the reduced color images, the reference RGB values being calculated and each entry check table being created before the size of the original color images is reduced; and     display means for displaying the reduced color images simultaneously on the screen reduced by said color image reducing means using the reference look-up table.

2. A device as claimed in claim 1, wherein said color image reducing means comprises:

region dividing means for dividing each of the original color images into a plurality of regions; and     reduced image generating means for accessing one of the entry check tables and the reference look-up table for each pixel included in each region and for loading the RGB value corresponding to the table entry for a given pixel, thereby for selectively determining a representative pixel of the region based on the RGB values thereof and for generating the reduced color images.

3. A device as claimed in claim 2, wherein the reference look-up table has reference table entries equal in number to number of predetermined colors, and the red, green, and blue component values are represented by i, j, and k bits digital values, respectively,     wherein $2^{(i+j+k)}$ is equal in number to the number of predetermined colors.

4. A device as claimed in claim 3, wherein the number of predetermined colors is equal to 256.

5. A device as claimed in claim 1, wherein the reference look-up table stores RGB values assigned step-wise and regularly for each table entry.

6. A device as claimed in claim 2, wherein said reduced image generating means calculates the RGB value of the representative pixel by averaging the RGB values of all pixels in a given region.

7. A device as claimed in claim 3, wherein said reduced image generating means calculates an average of all of the digital values rather than averaging the RGB values of all pixels in a given region.

8. A method for reducing a size of a color image as a reduced color image expressing a plurality of reduced color images with predetermined colors simultaneously, each of the original and reduced color images comprising a plurality of pixels, each pixel having a respective pixel value, reducing the size of the color image using a plurality of look-up tables, each of the look-up tables corresponding to a respective one of the original color images for storing the table entries and a corresponding RGB value of each pixel of a corresponding original color image to express the same with the predetermined colors, said method comprising the steps of:

(A) creating a reference look-up table having as many reference table entries as a number of the respective pixel values, the reference look-up table storing the RGB values, as reference RGB values, assigned previously to the corresponding table entries, expressing the reduced color images with the predetermined colors, a number of the plurality of look-up tables being equal to a number of the plurality of reduced color images and to a number of the original color images;

(B) calculating the reference RGB values closest to the RGB values of the look-up tables;

(C) creating entry check tables, each entry check table corresponding to one of the plurality of look-up tables and for use in translating the table entries of the look-up table into the reference table entries;

(D) reducing the size of the original color images by accessing one of the entry check tables to generate the reduced color images, the reference RGB values being calculated and each entry check table being created before the size of the original color images is reduced; and     (E) displaying the reduced color images simultaneously on a screen using the reference look-up table.

9. A method as claimed in claim 8, wherein said step (D) includes the steps of:

(a) dividing each of the original color images into a plurality of regions; and     (b) accessing one of the entry check tables and the reference look-up table for each pixel included in each region for loading the RGB value corresponding to the table entry for given pixel, thereby selectively determining a representative pixel of the region based on the RGB values thereof to generate the reduced color images.

10. A method as claimed in claim 9, wherein the reference look-up table has the reference table entries equal in number to a number of the predetermined colors, and the red, green, and blue component values are represented by i, j, and k bits digital values, respectively,     where $2^{(i+j+k)}$ is equal to the number of the predetermined colors.

11. A method as claimed in claim 10, wherein the number of the predetermined colors is equal to 256.

12. A method as claimed in claim 9, wherein the reference look-up table stores RGB values assigned step-wise and regularly for each table entry.

13. A method as claimed in claim 9, wherein said step (b) includes a step of calculating the RGB value of the representative pixel by averaging all of the RGB values of all pixels in a given region.

14. A method as claimed in claim 10, wherein said step (b) includes a step of calculating an average of all of the digital values rather than averaging the RGB values of all pixels in a given region.

15. A device as claimed in claim 2, wherein the reference look-up table stores RGB values assigned step-wise and regularly for each table entry.

16. A device as claimed in claim 3, wherein the reference look-up table stores RGB values assigned step-wise and regularly for each table entry.

17. A method as claimed in claim 9, wherein the reference look-up table stores RGB values assigned step-wise and regularly for each table entry.

18. A method as claimed in claim 10, wherein the reference look-up table stores RGB values assigned step-wise and regularly for each table entry.

* * * * *